Patented Aug. 13, 1940

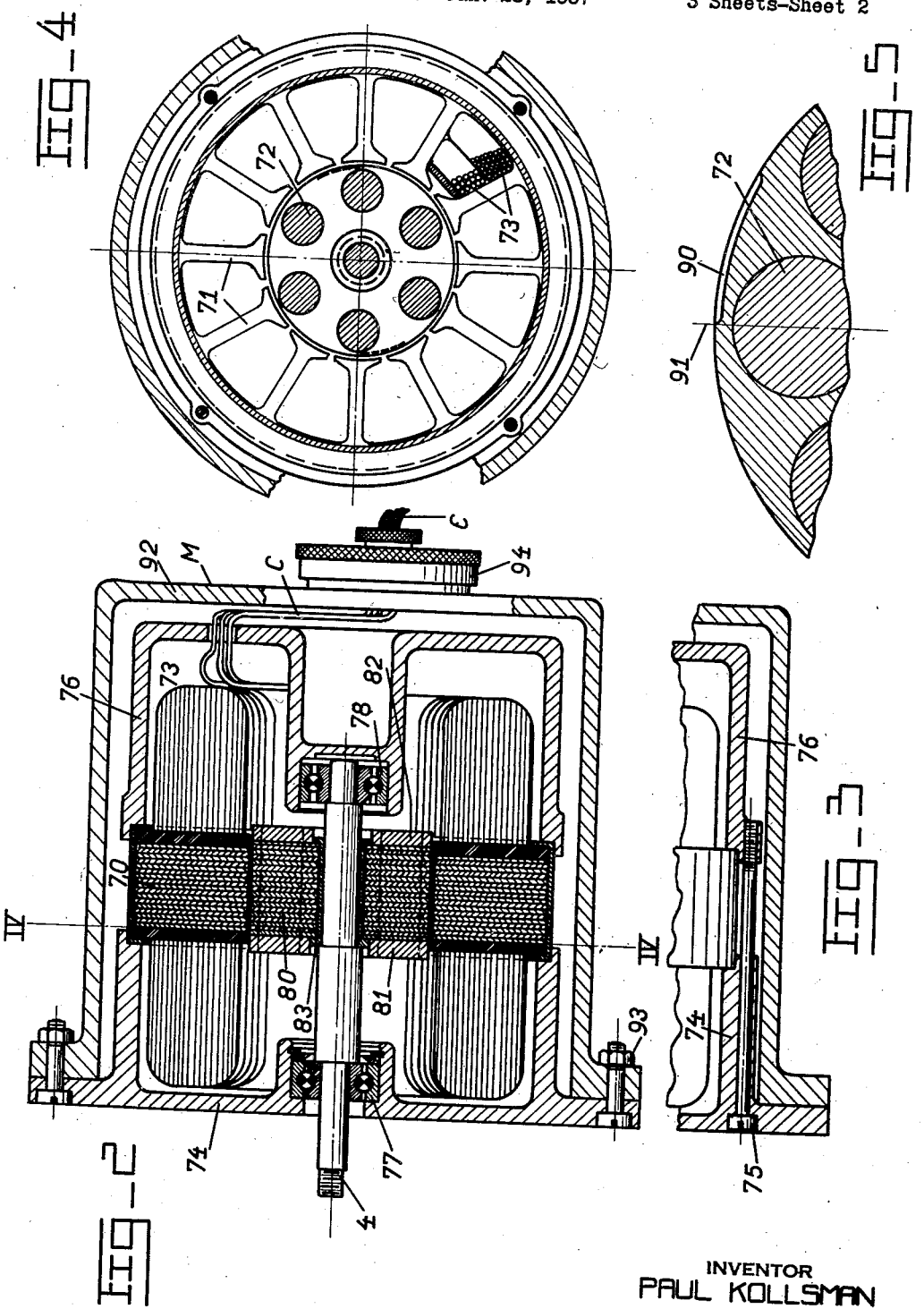

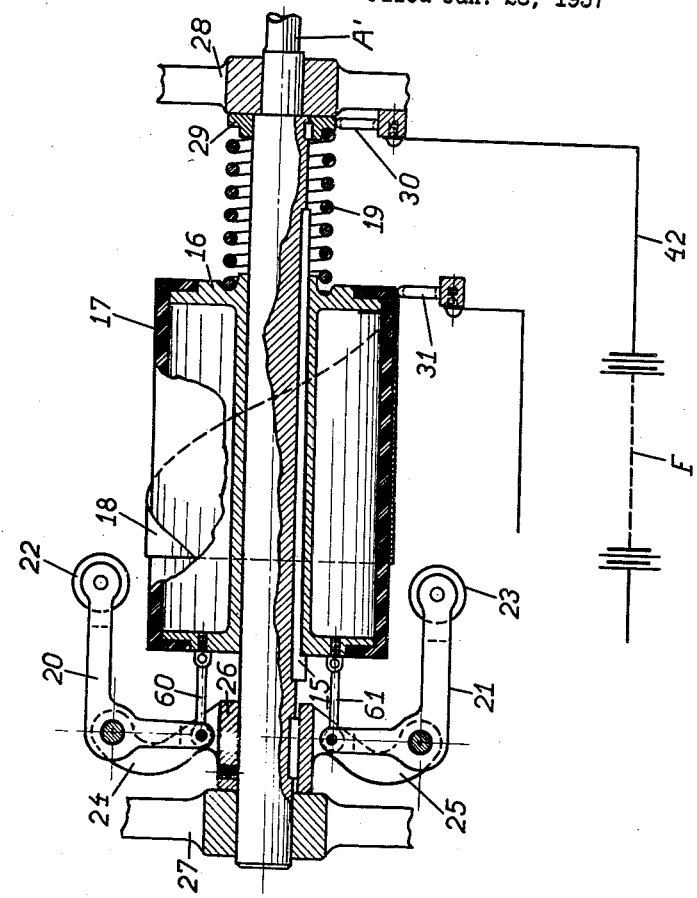

2,211,543

UNITED STATES PATENT OFFICE 2,211,543

REMOTE SPEED INDICATOR

Paul Kollsman, Stamford, Conn., assignor, by mesne assignments, to Square D Company, Detroit, Mich., a corporation of Michigan Application January 28, 1937, Serial No. 122,775

12 Claims. (Cl. 175—183)

This invention relates to the indication at a locality considerably remote from a prime mover such as a motor of a condition of its motion such as its speed in revolutions per unit of time.

An object of the invention is to produce and combine electric instrumentalities, including a repeater device coupled to drive an indicator such as a mechanical tachometer at a locality considerably remote from the motor, the revolutions of which are to be indicated and which electric motor is energized and controlled by connecting conductors, all in such a way as to permit accurate speed indication over a wide range such as from 3,500 R. P. M. down to 500 R. P. M.

In carrying out the general object of the invention it is proposed to generate and transmit electrical impulses, preferably three-phase in character, in synchronism with the R. P. M. of the prime mover motor and utilize them after transmission over a wire line to operate a self-starting, self-synchronizing motor, as a repeater device, which may be mechanically coupled to drive the indicator or tachometer proper.

I have found that the mere coupling of a polyphase generator to the prime mover motor and electrically connecting it remotely to an ordinary polyphase motor is inoperative over the complete range of 500 R. P. M. to 3,500 R. P. M. Additional provisions must be made. For example, objectively I have found that the object of the invention may be furthered if the time duration of each electrical impulse be maintained substantially constant regardless of the interruptions or cycles per unit of time. This may be accomplished by increasing the angle of electrical contact in a commutating device in proportion to the increase in revolutions per minute. For another example I have found that the provision of a three-phase generator driven directly from the prime mover and which delivers approximate three-phase sine waves is suitable for combining over a wire line with a specially designed three-phase motor, the special design of which includes a biasing of its rotor to synchronous operation while otherwise it is substantially of standard squirrel cage type.

A further object of the invention is to provide a polyphase motor self-starting and self-synchronizing over a wide range of speeds, preferably over the range of 500 R. P. M. to 3,500 R. P. M.

The above will be pointed out more particularly in the following claims which are directed to illustrative embodiments of the invention for the purpose of explanation. These embodiments are described in the following specification in connection with the accompanying drawings which form a part hereof.

This application is a companion case and presents the broad combination of structure, further details of which are shown in my co-pending applications, Serial Nos. 132,254 and 132,255 respectively, both filed March 22, 1937.

In the drawings Fig. 1 is a diagrammatic assemblage from the prime mover or engine, the speed of which is to be indicated through to the tachometer;

Fig. 2 is a longitudinal section through the motor M of Fig. 1;

Fig. 3 is a fractional cross-section of the structure of Fig. 2 indicating a sub-assembling;

Fig. 4 is a cross-section through the plane of line IV—IV of Fig. 2, parts being shown in elevation and parts being broken away;

Fig. 5 is an enlarged cross-section through the rotor of Fig. 4, parts being broken away;

Fig. 6 is a diagrammatic perspective view of the modification in which the provision for insuring self-starting and synchronism over a wide range of speeds embodies means for producing constant time of current impulse; and Fig. 7 is an enlarged detailed view of the compensating commutator of Fig. 6.

Shaft A is coupled to the prime mover, the speed of which is to be indicated at a distance and for the purposes of this disclosure may be considered as a rotating prime mover. Gears 1 and 2 are preferably employed to impart to the drive shaft 3 of a polyphase generator B a higher speed of rotation, than that of the prime mover, if desired, but at a speed greater than that of the fractional speed shaft to which A is directly coupled.

B represents any of the well-known types of polyphase generators, which may be termed a transmitter of impulses. For example, a three-phase generator feeding through the transmission line or conductors C and thereby energizing a self-starting, self-synchronizing polyphase motor M, the shaft 4 of which is caused to rotate synchronously with or at a synchronous multiple of the speed of rotation of the prime mover A. This shaft 4 directly drives a tachometer E preferably indicating the speed by means of indicator D shown in Fig. 1 as comprising two pointers 5 and 6 indicating upon the dial 7 preferably in the decimal system one digit apart so that the long pointer 5 may indicate hundreds or tens or the short pointer 6 may indicate tens or units, as may be desired.

It is to be understood that it is preferable that each of said first and said second contact member.

2. In a remote transmission system the combination with a multiphase A. C. motor including stationary field windings and a rotatable short-circuited armature; of a source of direct current; a transmitter including a plurality of first contact members and a second contact member rotatable relatively to, and in contact with, said first contact members, said transmitter being connected upon rotation to connect said source of current to successive field windings of said motor; and means responsive to the rate of rotary movement of said second contact and arranged to vary the rotary angle of engagement between said second and each of said first contacts.

3. A remote transmission system comprising, in combination, a multiphase A. C. motor including stationary field windings and a squirrel cage armature of non-homogeneous reluctance; a source of direct current; and a transmitter including a plurality of first contact members and a second contact member rotatable relatively to, and in contact with, said first contact members, said transmitter being connected upon rotation to connect said source of current to successive field windings of said motor; and means responsive to the rate of rotary movement of said second contact and arranged to vary the duration of contact between each of said first and said second contact member.

4. A distant reading tachometer system comprising, in combination, a tachometer; a multiphase A. C. motor connected to drive said tachometer, said motor including stationary field windings and a rotatable armature having short-circuited windings; a source of direct current; a transmitter including a plurality of first contact members and a second contact member rotatable relatively to, and in contact with, said first contact members, said transmitter being connected upon rotation to connect said source of current to successive field windings of said motor; and means responsive to the rate of rotary movement of said second contact and arranged to vary the duration of contact between each of said first and said second contact members.

5. A distant reading tachometer system comprising, in combination, a multiphase A. C. motor including stationary field windings and a squirrel cage armature having portions of reduced diameter; a source of direct current; a transmitter including a plurality of first contact members and a second contact member rotatable relatively to, and in contact with, said first contact members, said transmitter being connected upon rotation to connect said source of current to successive field windings of said motor; and means responsive to the rate of rotary movement of said second contact and arranged to vary the duration of contact between each of said first and said second contact members.

6. In a remote transmission system a rotary transmitter for creating electric impulses in response to a rotary movement; and means responsive to the rate of said rotary movement connected to increase the relative duration per rotation of said impulses upon an increase in the rate of rotary motion, the duration being expressed as the number of degrees of angular motion during which an impulse is given during each revolution.

7. In a remote transmission system a rotary transmitter for creating electric impulses in response to a rotary movement; and a fly-ball governor responsive to the rate of said rotary movement and connected to vary the relative duration per rotation of said impulses.

8. In a remote transmission system a rotary transmitter including a plurality of first contact members and a second contact member rotatable relatively to, and in contact with, said first contact members; and means responsive to the rate of the rotary movement of said second contact member arranged to increase and decrease the rotary angle of engagement between said second and each of said first contact members.

9. A transmitter comprising, in combination, a conducting member rotatable about an axis and forming part of a cylindrical surface, the cylindrical surface being of varying peripheral width; a plurality of brushes arranged in substantially one plane normal to said axis to contact with said conducting member; and a flyweight subject to centrifugal force in response to the rate of rotation of said conducting member, said flyweight being connected to adjust said member and brushes relatively to each other in an axial direction.

10. A transmitter comprising, in combination, a conducting member rotatable about an axis and forming part of a cylindrical surface, the cylindrical surface being of varying peripheral width; a plurality of brushes arranged in substantially one plane normal to said axis to contact with said conducting member; a flyweight subject to centrifugal force in response to the rate of rotation of said conducting member, said flyweight being connected to adjust said member and brushes relatively to each other in an axial direction; and means for biasing said brushes and member towards a predetermined relative position.

11. A transmitter comprising, in combination, a shaft mounted for rotation; a conducting member mounted on said shaft for rotation therewith and axial movement relatively thereto, said conducting member forming part of a cylindrical surface, the cylindrical surface being of varying peripheral width; a plurality of brushes arranged in substantially one plane normal to said shaft to contact with said conducting member; a pair of flyweights mounted for rotation with said shaft and connected to displace said member relatively to said shaft in axial direction; and a spring arranged to counteract said flyweights.

12. In a remote transmission system, a rotary transmitter for creating electric impulses in response to a rotary movement; and means responsive to the rate of said rotary movement connected to maintain substantially constant the duration of time of each of said impulses over a substantial range of R. P. M.

PAUL KOLLSMAN.

Aug. 13, 1940.　　　　B. E. WINKLER　　　2,211,551
WELDING GUN
Filed Feb. 17, 1939
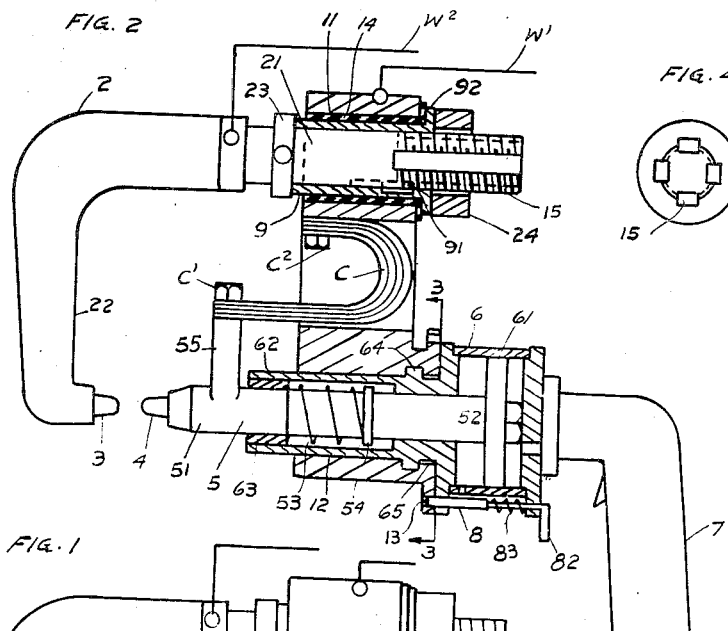
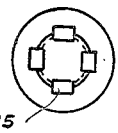
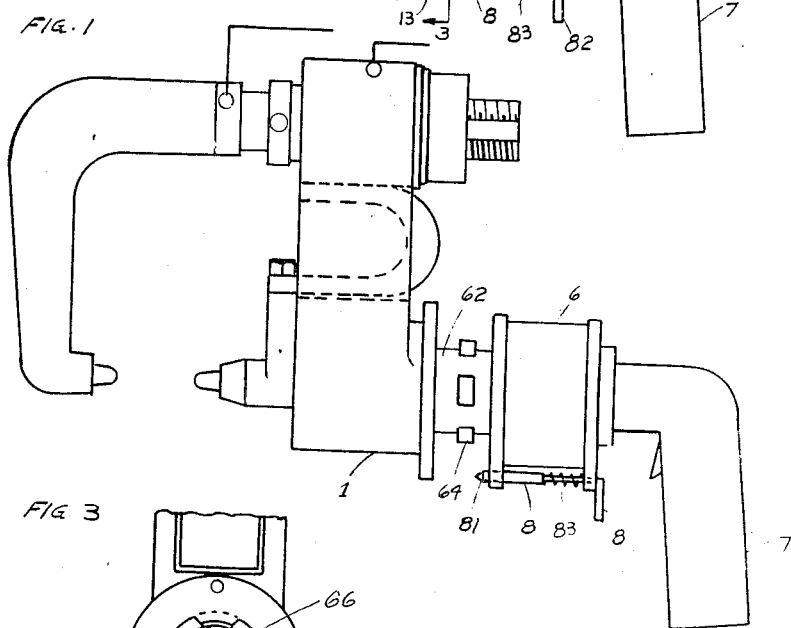
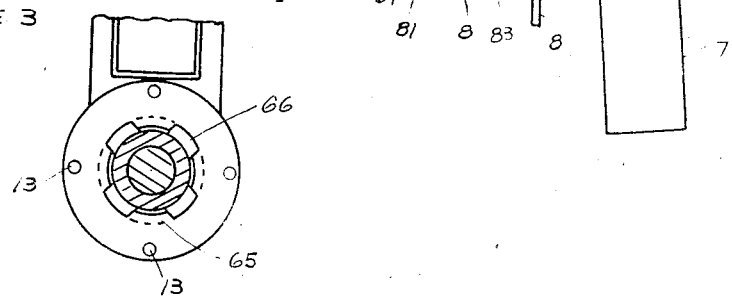
INVENTOR.
Bruno E. Winkler